United States Patent
Billmaier et al.

(10) Patent No.: US 8,285,726 B2
(45) Date of Patent: Oct. 9, 2012

(54) PRESENTING MEDIA GUIDANCE SEARCH RESULTS BASED ON RELEVANCY

(75) Inventors: David Billmaier, Woodinville, WA (US); Michael Ross Starkenburg, Costa Mesa, CA (US)

(73) Assignee: United Video Properties, Inc., Santa Clara, CA (US)

( * ) Notice: Subject to any disclaimer, the term of this patent is extended or adjusted under 35 U.S.C. 154(b) by 0 days.

(21) Appl. No.: 12/551,507

(22) Filed: Aug. 31, 2009

(65) Prior Publication Data

US 2010/0115557 A1    May 6, 2010

Related U.S. Application Data

(63) Continuation of application No. 11/591,972, filed on Nov. 1, 2006, now abandoned.

(51) Int. Cl.
G06F 7/00 (2006.01)
G06F 17/30 (2006.01)

(52) U.S. Cl. ........ 707/748; 707/754; 707/758; 715/716; 715/727; 715/730; 715/788

(58) Field of Classification Search .................. 715/716; 725/43, 42; 709/219; 707/3, 706, 736, 758, 707/913, 748
See application file for complete search history.

(56) References Cited

U.S. PATENT DOCUMENTS

| | | | |
|---|---|---|---|
| 5,801,787 A * | 9/1998 | Schein et al. ................... | 725/43 |
| 6,239,794 B1 | 5/2001 | Yuen et al. | |
| 6,388,714 B1 | 5/2002 | Schein et al. | |
| 6,564,378 B1 | 5/2003 | Satterfield et al. | |
| 6,756,997 B1 * | 6/2004 | Ward et al. ..................... | 715/716 |
| 6,898,762 B2 * | 5/2005 | Ellis et al. ...................... | 715/716 |
| 7,054,878 B2 * | 5/2006 | Gottsman et al. ..................... | 1/1 |
| 7,165,098 B1 * | 1/2007 | Boyer et al. ................... | 709/219 |
| 7,283,992 B2 | 10/2007 | Liu et al. | |
| 7,334,195 B2 | 2/2008 | Gemmell et al. | |
| 7,458,093 B2 | 11/2008 | Dukes et al. | |
| 7,673,314 B2 | 3/2010 | Ellis et al. | |
| 2002/0059610 A1 | 5/2002 | Ellis | |
| 2002/0174430 A1 | 11/2002 | Ellis et al. | |
| 2003/0093792 A1 | 5/2003 | Labeeb et al. | |
| 2003/0105589 A1 | 6/2003 | Liu et al. | |
| 2003/0110163 A1 * | 6/2003 | Chen et al. ........................ | 707/3 |

(Continued)

FOREIGN PATENT DOCUMENTS

EP    0854 645    7/1998

(Continued)

OTHER PUBLICATIONS

Van Barneveld et al., "Designing Usable Interfaces for TV Recommender Systems," *Personalized Digital Television*, 6:259-286 (2004) XP-002417580 pp. 1-28.

*Primary Examiner* — Giovanna Colan
(74) *Attorney, Agent, or Firm* — Ropes & Gray LLP

(57) ABSTRACT

Systems and methods for presenting search results based on relevancy in an interactive media guidance application are disclosed. After performing a user-initiated or automatic search for media content, the interactive media guidance application determines which of the hits are most relevant to the user. The guidance application then displays, or visually identifies, the relevant items. Some embodiments employ using different display arrangements based on the number of relevant items. Some embodiments display the relevant items in recommendation lists or hot lists.

34 Claims, 17 Drawing Sheets

U.S. PATENT DOCUMENTS

| | | |
|---|---|---|
| 2003/0110499 A1* | 6/2003 | Knudson et al. .................. 725/42 |
| 2004/0070593 A1* | 4/2004 | Neely et al. .................... 345/716 |
| 2004/0117831 A1 | 6/2004 | Ellis et al. |
| 2004/0131336 A1 | 7/2004 | Matsuno et al. |
| 2005/0028208 A1 | 2/2005 | Ellis et al. |
| 2005/0080769 A1 | 4/2005 | Gemmell et al. |
| 2006/0271953 A1 | 11/2006 | Jacoby et al. |
| 2006/0294073 A1* | 12/2006 | Hamadi ............................ 707/3 |
| 2007/0039023 A1 | 2/2007 | Kataoka |
| 2007/0067271 A1* | 3/2007 | Lu ...................................... 707/3 |
| 2007/0078822 A1* | 4/2007 | Cucerzan et al. ................. 707/3 |
| 2007/0101300 A1* | 5/2007 | Rodden et al. ................ 715/864 |
| 2007/0112740 A1* | 5/2007 | Geva ................................. 707/3 |
| 2007/0180401 A1* | 8/2007 | Singh et al. ................... 715/794 |
| 2007/0214132 A1* | 9/2007 | Grubb et al. ....................... 707/5 |
| 2008/0092155 A1 | 4/2008 | Ferrone et al. |
| 2008/0092156 A1 | 4/2008 | Ferrone |
| 2008/0104057 A1 | 5/2008 | Billmaier et al. |
| 2008/0104127 A1 | 5/2008 | Billmaier et al. |
| 2010/0083155 A1* | 4/2010 | Farago et al. ................. 715/769 |
| 2010/0131983 A1 | 5/2010 | Shannon et al. |
| 2010/0153885 A1 | 6/2010 | Yates |
| 2011/0113039 A1* | 5/2011 | Venkataraman et al. ..... 707/748 |

FOREIGN PATENT DOCUMENTS

| | | |
|---|---|---|
| EP | 1 463 307 | 9/2004 |
| EP | 1463307 A2 * | 9/2004 |

* cited by examiner

| DIGITAL CABLE | 🔍 By Keyword | 7:03pm |

Keyword: Lord
One you have typed in your keyword, highlight and select it to see your results

| Keyword | Results (1328 Matches) |
|---|---|
| LORD ▶ | Lord of Illusions |
| Del \| Sp \| Save | The Lord of the Rings: The Return of the King |
| A B C D E F | The Lord of the Rings: The Two Towers |
| G H I J K L | The Lord of the Rings: Fellowship of the Ring |
| M N O P Q R | Lord of the Flies |
| S T U V W X | |
| Y Z 1 2 3 4 | Lord Jim |
| 5 6 7 8 9 0 | Lord Jeff |

FIG. 3A

| DIGITAL CABLE | 🔍 By Category | 7:03pm |

Air Force One
8-10p

| Category | Sub-Category | Results (6023 Matches) |
|---|---|---|
| Movie ▶ | Action ▶ | The Abyss |
| Sports | Adventure | The Abyss |
| TV Shows | Comedy | Air Force One |
| Kids | Documentary | Air Force One |
| | Drama | Air Force One Extras |
| | Mystery | Air Force One HD |
| | Sci Fi | Air Force One WS |

FIG. 3B

| DIGITAL CABLE | 🔍 By Keyword | 7:03pm |
|---|---|---|
| Keyword: Lord<br>One you have typed in your keyword, highlight and select it to see your results ||| 
| Keyword | Results (3 Matches) ||
| LORD ▶ | The Lord of the Rings: Return of the King ||
| Del \| Sp \| Save | The Lord of the Rings: The Two Towers ||
| A B C D E F<br>G H I J K L<br>M N O P Q R<br>S T U V W X<br>Y Z 1 2 3 4<br>5 6 7 8 9 0 | The Lord of the Rings: Fellowship of the Ring ||

FIG. 4A

| DIGITAL CABLE | 🔍 By Category | 7:03pm |
|---|---|---|
| Missing In Action 2 — The Beginning<br>8-10p ||| 
| Category | Sub-Category | Results (25 Matches) |
| Movie ▶ | Action ▶ | Blackhawk Down |
| Sports | Adventure | Braddock: Missing in Action III |
| TV Shows | Comedy | Missing In Action |
| Kids | Documentary | Missing In Action 2 — The Beginning |
| | Drama | Rambo |
| | Mystery | Rambo II |
| | Sci Fi | Rambo III |
| ▼ |||

FIG. 4B

| DIGITAL CABLE | 🔍 By Keyword | | 7:03pm | |
|---|---|---|---|---|
| Keyword: Lord<br>One you have typed in your keyword, highlight and select it to see your results ||||  |
| Keyword |||| Results (1328 Matches) |
| LORD | | | ▲ Save | Lord of Illusions |
| Del | Sp | D E F | | The Lord of the Rings: The Return of the King |
| A B C | | | | The Lord of the Rings: The Two Towers |
| G H I | J K L | | | The Lord of the Rings: Fellowship of the Ring |
| M N O | P Q R | | | Lord of the Flies |
| S T U | V W X | | | Lord Jim |
| Y Z 1 | 2 3 4 | | | Lord Jeff |
| 5 6 7 | 8 9 0 | | |  |

410

Based on your previous selections, you are probably looking for:

The Lord of the Rings: Return of the King

The Lord of the Rings: The Two Towers

The Lord of the Rings: Fellowship of the Ring

| DIGITAL CABLE | By Keyword | 7:03pm |

Keyword: Lord
One you have typed in your keyword, highlight and select it to see your results

| Keyword | Results (1328 Matches) | Other people who typed "Lord" were looking for: |
|---|---|---|
| LORD ▲ | Lord of Illusions | |
| Del \| Sp \| Save | The Lord of the Rings: The Return of the King | The Lord of the Rings: Return of the King |
| A B C D E F | The Lord of the Rings: The Two Towers | |
| G H I J K L | The Lord of the Rings: Fellowship of the Ring | The Lord of the Rings: The Two Towers |
| M N O P Q R | Lord of the Flies | |
| S T U V W X | Lord Jim | The Lord of the Rings: Fellowship of the Ring |
| Y Z 1 2 3 4 | Lord Jeff | |
| 5 6 7 8 9 0 | | |

| User | Attribute | Value | Relevance Value | Day Part |
|---|---|---|---|---|
| User 1 | Genre | Action | 10 | 20-22 |
| User 1 | Actor | Chuck Norris | 9 | 20-22 |
| User 1 | Movie | Missing in Action | 10 | 20-22 |
| User 2 | Genre | Children's | 10 | 14-17 |
| User 2 | Actor | Dylan Sprouse | 9 | 14-17 |
| User 2 | Movie | Harry Potter | 9 | 14-17 |

| | |
|---|---|
| Module | Top on Demand |
| Results | 6 |
| Size | 400 x 600 |
| Element Size | 400 x 100 |
| Color Set | Pastel |
| Module | Top on Demand |
| Results | 3 |
| Size | 400 x 600 |
| Element Size | 400 x 200 |
| Color Set | Blues |

FIG. 15

PRESENTING MEDIA GUIDANCE SEARCH RESULTS BASED ON RELEVANCY

CROSS REFERENCE TO RELATED APPLICATION

This application is a continuation of U.S. patent application Ser. No. 11/591,972, filed Nov. 1, 2006 now abandoned. This prior application is hereby incorporated by reference herein in its entirety.

BACKGROUND OF THE INVENTION

The present invention is directed to search features in interactive media guidance application systems.

Modern content delivery systems provide media consumers with access to unprecedented amounts of media. For example, home media consumers can access video programming from cable and satellite systems having hundreds of channels. Add to a media consumer's system a digital recorder and the possibilities for what the consumer may access at any given time become virtually endless.

The vast amount of available media content presents challenges for guiding consumers efficiently to the media they want. When a guidance application user performs a search for media content, for example, the number of search results ("hits") can often be overwhelming. This is especially true when the guidance application searches multiple sources of content. The problem is further compounded by the fact that many hits technically meet the user's search criteria but are not really what the user is looking for. Thus, what is needed is an intelligent technique that ensures relevant search results are provided.

SUMMARY OF THE INVENTION

In accordance with the principles of the present invention, systems and methods for presenting search results based on relevancy in an interactive media guidance application are provided. After performing a user-initiated or automatic search for media content, the interactive media guidance application determines which of the hits are most relevant to the user. This relevancy determination may be based on personalization data derived by monitoring user interactions with the interactive media guidance application, or from express user media preference designations. In still other embodiments, the relevancy determination may be made based on what other users selected from the results of a similar search.

After determining which results are relevant to the user, the guidance application then displays, or visually identifies, the relevant items. This may be accomplished by, for example, displaying only the relevant results, changing the color of the relevant results, highlighting or marking the relevant results, using a recommendations area or "hot list" area (hot lists are a type of recommendation based on the behavior of other users) for the relevant results, or using any other suitable approach.

In some embodiments, the guidance application determines relevancy based on a relevancy threshold. The relevancy threshold may be defined using any suitable approach. For example, the threshold may be a defined percentage of the number of words associated with the content (e.g., program listings, program titles, program descriptions, scene metadata, etc.) that meet the user-supplied criteria. Or, in some embodiments, the relevancy threshold may be defined using a distance algorithm. The relevancy threshold may be hard-programmed into the application (i.e., into the programming logic), or it may be defined in data received by the application.

Some embodiments may employ a varying relevancy threshold. The threshold may vary, for example, based on the number of hits meeting the threshold. When the number of hits meeting the relevancy threshold is below a minimum number, the guidance application incrementally lowers the relevancy threshold until the minimum number of relevant hits is met. In other approaches, the threshold may be varied by day part. In yet other approaches, the interactive media guidance application may receive user inputs adjusting the relevancy threshold.

The search criteria may be derived using any suitable approach. In some embodiments, for example, the interactive media guidance application receives the criteria from user input. In other embodiments, the interactive media guidance application generates the criteria from user personalization data.

The interactive media guidance application may display the matching, relevant results using any suitable approach. For example, the results may be represented as text, graphics, or video, and may be displayed in a list or a mosaic. The guide may sort results by relevance.

The guide may change the display characteristics of the relevant results depending on the number of relevant results, the relevancy threshold itself, or other suitable factors. For example, the guide may vary the display area size of a guidance display module used for the relevant results, the colors of the relevant results, the positional arrangement of the results (or modules containing the results), or the application modules included in a display. The display characteristics may also be varied by day part.

Further features of the invention, its nature and various advantages will be more apparent from the accompanying drawings and the following detailed description of the preferred embodiments.

BRIEF DESCRIPTION OF THE DRAWINGS

FIGS. 3a and 3b are illustrative search result displays;

FIGS. 4a-4d are illustrative search result displays in accordance with one embodiment of the present invention;

FIG. 13 is an illustrative data structure for a personalization data table in accordance with one embodiment of the present invention;

FIG. 15 is an illustrative data structure for a display definition in accordance with one embodiment of the present invention.

DETAILED DESCRIPTION

The amount of media available to users in any given media delivery system can be substantial. Consequently, many users desire a form of media guidance through an interface that allows users to efficiently navigate media selections and easily identify media that they may desire. An application which provides such guidance is referred to herein as an interactive media guidance application or, sometimes, a media guidance application or a guidance application.

Interactive media guidance applications may take various forms depending on the media for which they provide guidance. One typical type of media guidance application is an interactive television program guide. Interactive television program guides (sometimes referred to as electronic program guides) are well-known guidance applications that, among other things, allow users to navigate among and locate many types of media content including conventional television programming (provided via traditional broadcast, cable, satellite, Internet, or other means), as well as pay-per-view programs, on-demand programs (as in video-on-demand (VOD) systems), Internet content (e.g., streaming media, downloadable media, Webcasts, etc.), and other types of media or video content. Guidance applications also allow users to navigate among and locate content related to the video content including, for example, video clips, articles, advertisements, chat sessions, games, etc.

With the advent of the Internet, mobile computing, and high-speed wireless networks, users are accessing media on personal computers (PCs) and other devices on which they traditionally did not, such as hand-held computers, personal digital assistants (PDAs), mobile telephones, or other mobile devices. On these devices users are able to navigate among and locate the same media available through a television. Consequently, media guidance is necessary on these devices, as well. The guidance provided may be for media content available only through a television, for media content available only through one or more of these devices, or for media content available both through a television and one or more of these devices. The media guidance applications may be provided as on-line applications (i.e., provided on a web-site), or as stand-alone applications or clients on hand-held computers, PDAs, mobile telephones, or other mobile devices. The various devices and platforms that may implement media guidance applications are described in more detail below.

Figure 1:
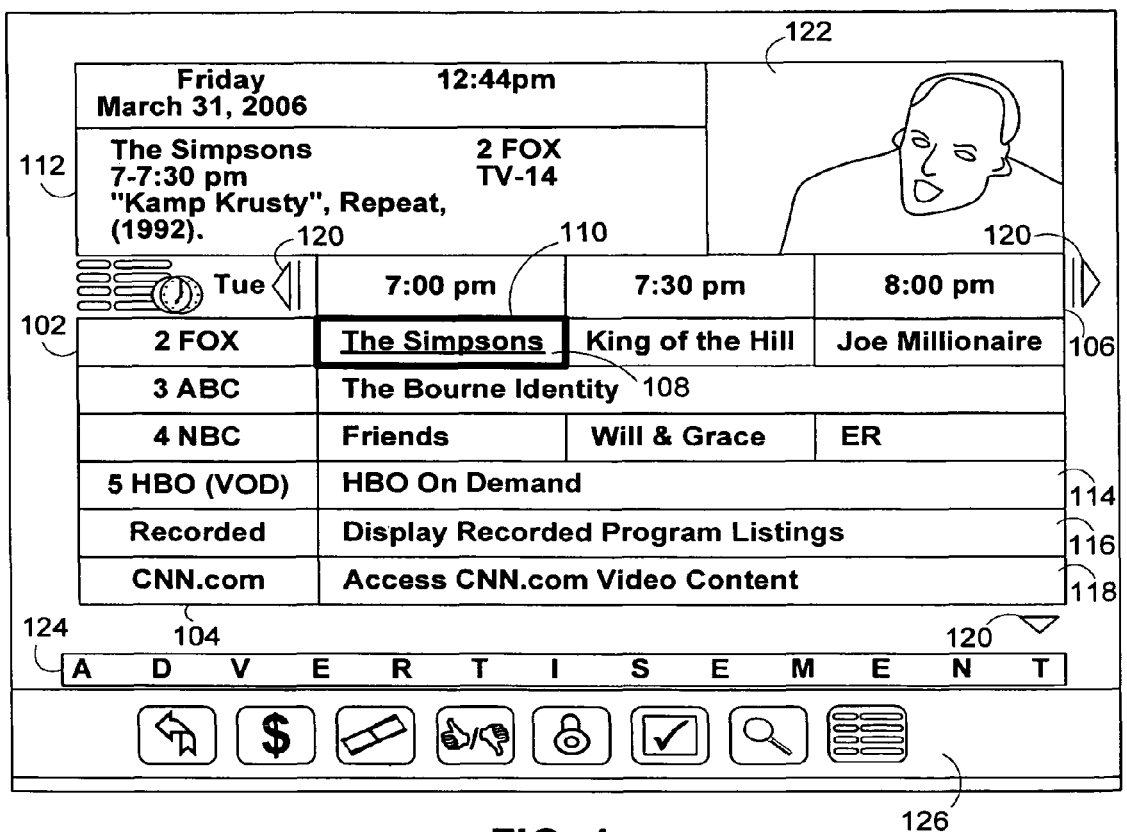
FIG. 1 shows an illustrative interactive media guidance application display screen in accordance with one embodiment of the present invention.
Figure 2:
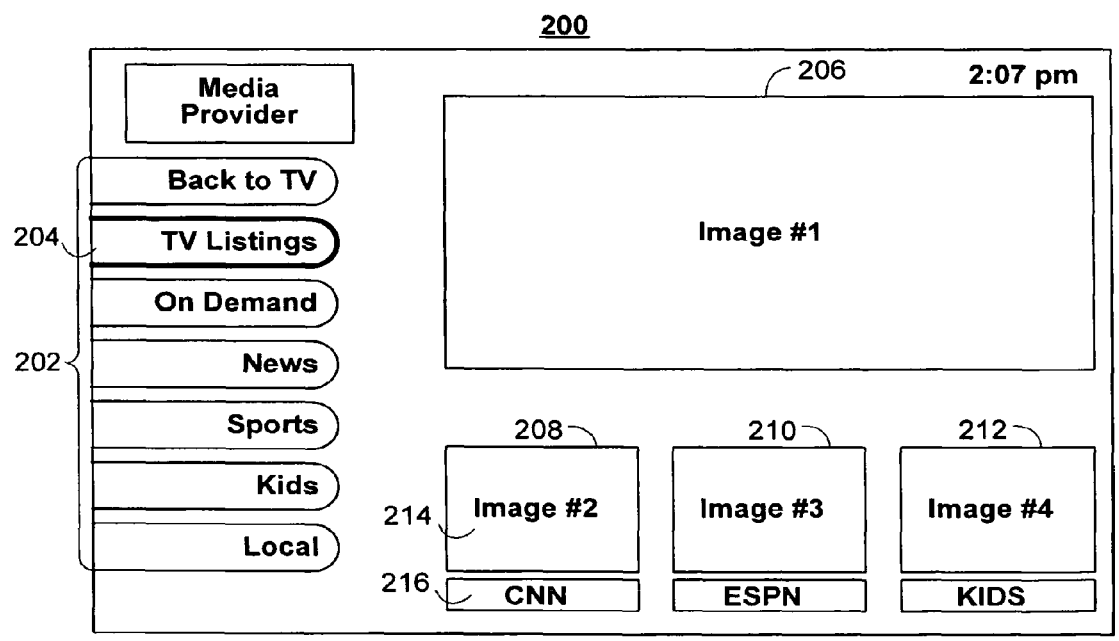
FIG. 2 shows another illustrative interactive media guidance application display screen in accordance with one embodiment of the present invention.

One of the functions of the media guidance application is to provide media listings and media information to users. FIGS. 1-2 show illustrative display screens that may be used to provide media guidance, and in particular media listings. The display screens shown in FIGS. 1-2 may be implemented on any suitable device or platform. While the displays of FIGS. 1-2 are illustrated as full screen displays, they may also be fully or partially overlaid over media content being displayed. A user may indicate a desire to access media information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media information organized in one of several ways, such as by time and channel in a grid, by time, by channel, by media type, by category (e.g., movies, sports, news, children, or other categories of programming), or other predefined, user-defined, or other organization criteria.

FIG. 1 shows illustrative grid program listings display 100 arranged by time and channel that also enables access to different types of media content in a single display. Display 100 may include grid 102 with: (1) a column of channel/media type identifiers 104, where each channel/media type identifier (which is a cell in the column) identifies a different channel or media type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming provided according to a schedule, the media guidance application also provides access to non-linear programming which is not provided according to a schedule. Non-linear programming may include content from different media sources including on-demand media content (e.g., VOD), Internet content (e.g., streaming media, downloadable media, etc.), locally stored media content (e.g., video content stored on a digital video recorder (DVR), digital video disc (DVD), video cassette, compact disc (CD), etc.), or other time-insensitive media content. On-demand content may include both movies and original media content provided by a particular media provider (e.g., HBO On Demand providing "The Sopranos" and "Curb Your Enthusiasm"). HBO ON DEMAND, THE SOPRANOS, and CURB YOUR ENTHUSIASM are trademarks owned by the Home Box Office, Inc. Internet content may include web events, such as a chat session or Webcast, or content available on-demand as streaming media or downloadable media through an Internet web site or other Internet access (e.g. FTP).

Grid 102 may provide listings for non-linear programming including on-demand listing 114, recorded media listing 116, and Internet content listing 118. A display combining listings for content from different types of media sources is sometimes referred to as a "mixed-media" display. The various permutations of the types of listings that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In other embodiments, listings for these media types may be included directly in grid 102. Additional listings may be displayed in response to the user selecting one of the navigational icons

120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the present invention.

Advertisement 124 may provide an advertisement for media content that, depending on a viewer's access rights (e.g., for subscription programming), is currently available for viewing, will be available for viewing in the future, or may never become available for viewing, and may correspond to or be unrelated to one or more of the media listings in grid 102. Advertisement 124 may also be for products or services related or unrelated to the media content displayed in grid 102. Advertisement 124 may be selectable and provide further information about media content, provide information about a product or a service, enable purchasing of media content, a product, or a service, provide media content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over media content or a guidance application display or embedded within a display. Advertisements may also include text, images, rotating images, video clips, or other types of media content. Advertisements may be stored in the user equipment with the guidance application, in a database connected to the user equipment, in a remote location (including streaming media servers), or on other storage means or a combination of these locations. Providing advertisements in a media guidance application is discussed in greater detail in, for example, Knudson et al., U.S. patent application Ser. No. 10/347,673, filed Jan. 17, 2003, Ward, III et al. U.S. Pat. No. 6,756,997, issued Jun. 29, 2004, and Schein et al. U.S. Pat. No. 6,388,714, issued May 14, 2002, which are hereby incorporated by reference herein in their entireties. It will be appreciated that advertisements may be included in other media guidance application display screens of the present invention.

Options region 126 may allow the user to access different types of media content, media guidance application displays, and/or media guidance application features. Options region 126 may be part of display 100 (and other display screens of the present invention), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, access to various types of listing displays, subscribe to a premium service, edit a user's profile, access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of media content listings displayed (e.g., only HDTV programming, user-specified broadcast channels based on favorite channel selections, re-ordering the display of channels, recommended media content, etc.), desired recording features (e.g., recording or series recordings for particular users, recording quality, etc.), parental control settings, and other desired customizations.

The media guidance application may allow a user to provide user profile information or may automatically compile user profile information. The media guidance application may, for example, monitor the media the user accesses and/or other interactions the user may have with the guidance application. Additionally, the media guidance application may obtain all or part of other user profiles that are related to a particular user (e.g., from other web sites on the Internet the user accesses, such as www.tvguide.com, from other media guidance applications the user accesses, from other interactive applications the user accesses, from a handheld device of the user, etc.), and/or obtain information about the user from other sources that the media guidance application may access. As a result, a user can be provided with a unified guidance application experience across the user's different devices. This type of user experience is described in greater detail below in connection with FIG. 9. Additional personalized media guidance application features are described in greater detail in Ellis et al., U.S. patent application Ser. No. 11/179,710, filed Jul. 11, 2005, Boyer et al., U.S. patent application Ser. No. 09/437,604, filed Nov. 9, 1999, and Ellis et al., U.S. patent application Ser. No. 10/105,128, filed Feb. 21, 2002, which are hereby incorporated by reference herein in their entireties.

Another display arrangement for providing media guidance is shown in FIG. 2. Video mosaic display 200 includes selectable options 202 for media content information organized based on media type, genre, and/or other organization criteria. In display 200, television listings option 204 is selected, thus providing listings 206, 208, 210, and 212 as broadcast program listings. Unlike the listings from FIG. 1, the listings in display 200 are not limited to simple text (e.g., the program title) and icons to describe media. Rather, in display 200 the listings may provide graphical images including cover art, still images from the media content, video clip previews, live video from the media content, or other types of media that indicate to a user the media content being described by the listing. Each of the graphical listings may also be accompanied by text to provide further information about the media content associated with the listing. For example, listing 208 may include more than one portion, including media portion 214 and text portion 216. Media portion 214 and/or text portion 216 may be selectable to view video in full-screen or to view program listings related to the video displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the media provider or based on user preferences. Various systems and methods for graphically accentuating media listings are discussed in, for example, Yates, U.S. patent application Ser. No. 11/324,202, filed Dec. 29, 2005, which is hereby incorporated by reference herein in its entirety.

The interactive media guidance application may provide other features, including media search features that employ the intelligent results displays of the present invention. FIGS. 3a and 3b show two illustrative types of search results displays. In the search display of FIG. 3a, the interactive media guidance application receives from the user keywords as search criteria. In FIG. 3b, the interactive media guidance application receives from the user category and subcategory identifiers as search criteria. In these examples, television programs and on-demand videos are the subject of the search, but in other embodiments the media guidance application may search for any one or more types of other media content.

Each of the search displays of FIGS. 3a and 3b demonstrate the deficiency with prior art searches; they provide more results than a user can practically review (in FIG. 3a there are 1328 matches and in 3b there are 6023). FIGS. 4a and 4b show the effect of determining which results are most relevant and only displaying those results in accordance with some embodiments of the present invention. In both cases the number of displayed matches were drastically reduced.

FIG. 4C shows another display arrangement for providing relevant results. In this example, all of the matching results are displayed in area 410. The relevant results are provided in recommendations area 420. In this example, the interactive media guidance application determined the relevancy of the results using personalization data for the user. FIG. 4d illustrates another example where a "hot list" area 430 is used to identify results that are relevant to popular picks based on what other users have liked.

In FIGS. 4a-4d are only illustrative. In other approaches (not shown), the entire result set may be displayed and the most relevant results may be presented or visually distinguished in other ways. For example, relevant results may be highlighted, marked, or colored differently than non-relevant hits. In some approaches, a range of colors or a set of marks or icons (e.g., one star, two stars, etc.), may be used to differentiate the relevant results.

Figure 5A:
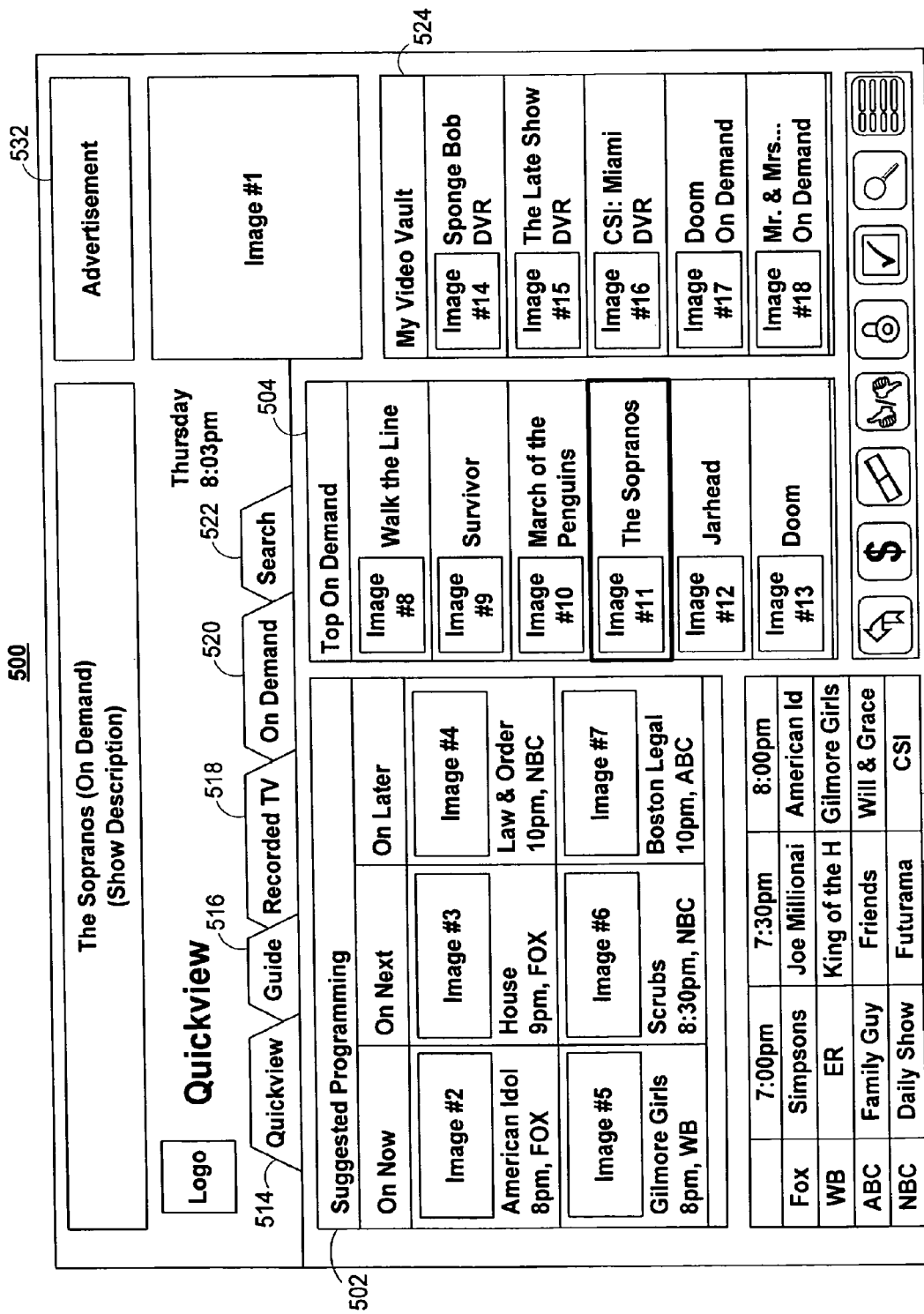
FIGS. 5a and 5b are illustrative modular quickview displays in accordance with one embodiment of the present invention.

Another illustrative interactive media guidance application display is shown in FIG. 5a. Display 500 is a modular quickview dashboard display that may be personalized by the user as described, for example, in Shannon et al. U.S. application Ser. No. , filed Sep. 29, 2006, which is hereby incorporated by reference herein in its entirety. Each module of display 500 may provide access to different types of media content in different arrangements. However, the multiple modules of display 500 provide the user with ready access to these different types of media in a single unified display screen. Module display types include, for example, Grid Guide, Program Information, Suggested Programming, Watch List, Purchased VOD, Recorded Programs, Programs Scheduled to Record, Most Popular/Highest Rated lists, Search, Program/Movie Browser, Editorial Review, Video Previews, TV Planner, or any other suitable guidance application features. In certain implementations, only a limited number of modules are simultaneously provided within a display screen due to space constraints. For example, on display 500 of FIG. 5a, only "Suggested Programming" module 502, "Top On Demand" module 504, "Grid guide" module 550, and "My Video Vault" module 524 are presented to the users.

"Top On Demand" module 504 includes graphical listings for non-linear, on-demand programming. Similarly, "Suggested Programming" module 502, which suggests current and future programming options that may be of interest to a user, also includes listings for linear programming. "Grid guide" module 550, on the other hand, is capable of providing listings for linear programming, non-linear programming, and any combination thereof. Thus, it can be seen that through the use of multiple guidance modules, listings for multiple media types may be provided in a convenient format. More detailed descriptions of these particular modules are provided in Shannon et al. U.S. patent application Ser. No. 11/541,299, filed Sep. 29, 2006, already incorporated by reference herein in its entirety.

In addition to providing personalized guidance for media content from a myriad of media sources and in a myriad of combinations, display 500 is also able to present media listings in a variety of display arrangements. Modules such as "Suggested Programming" module 502, "Top On Demand" module 504 and "My Video Vault" module 524 present listings for media content in a video mosaic display. "Suggested Programming" module 502, on the other hand, is organized as a video mosaic display a multi-column fashion. "Top On Demand" module 504 is also provides a video mosaic display, but in a single-column display fashion. In addition, modules such as "Grid Guide" 550 present listings for media content in a grid display and uses only textual information regarding the media content.

The quickview display of the embodiment of FIG. 5a is presented by the guidance application in response to the user selecting Quickview tab 514. The guidance application may provide other displays for other tabs, such as Guide 516, Recorded TV 518, On Demand 520, Search 522, etc. Guide tab 516 displays modules having grid guides for personalized media content listings. Recorded TV tab 518 displays modules having listings for media content recorded by a user household. On-Demand tab 520 displays modules having listings for most popular or highest rated On-Demand programs currently available through the media Guide application.

In quickview mode, the guidance application displays abridged versions of the abovementioned modules whose complete listings are viewable from one or more of the other tabs. For example, the quickview display of FIG. 5a (which is presented by the guide in response to the user selecting quickview tab 514) includes a portion of "Suggested Programming" module 502 that may normally appear in Guide tab 516. Quickview tab 514 further includes a portion of "Top On Demand" module 504 and a portion of "My Video Vault" module 524, whose complete listings may be selectable from On Demand tab 520 and Recorded TV tab 518, respectively. The media guidance application selects media for the quickview modules by searching for matching content based on search criteria, and determining the media content that are most relevant to the user.

Figure 5B:
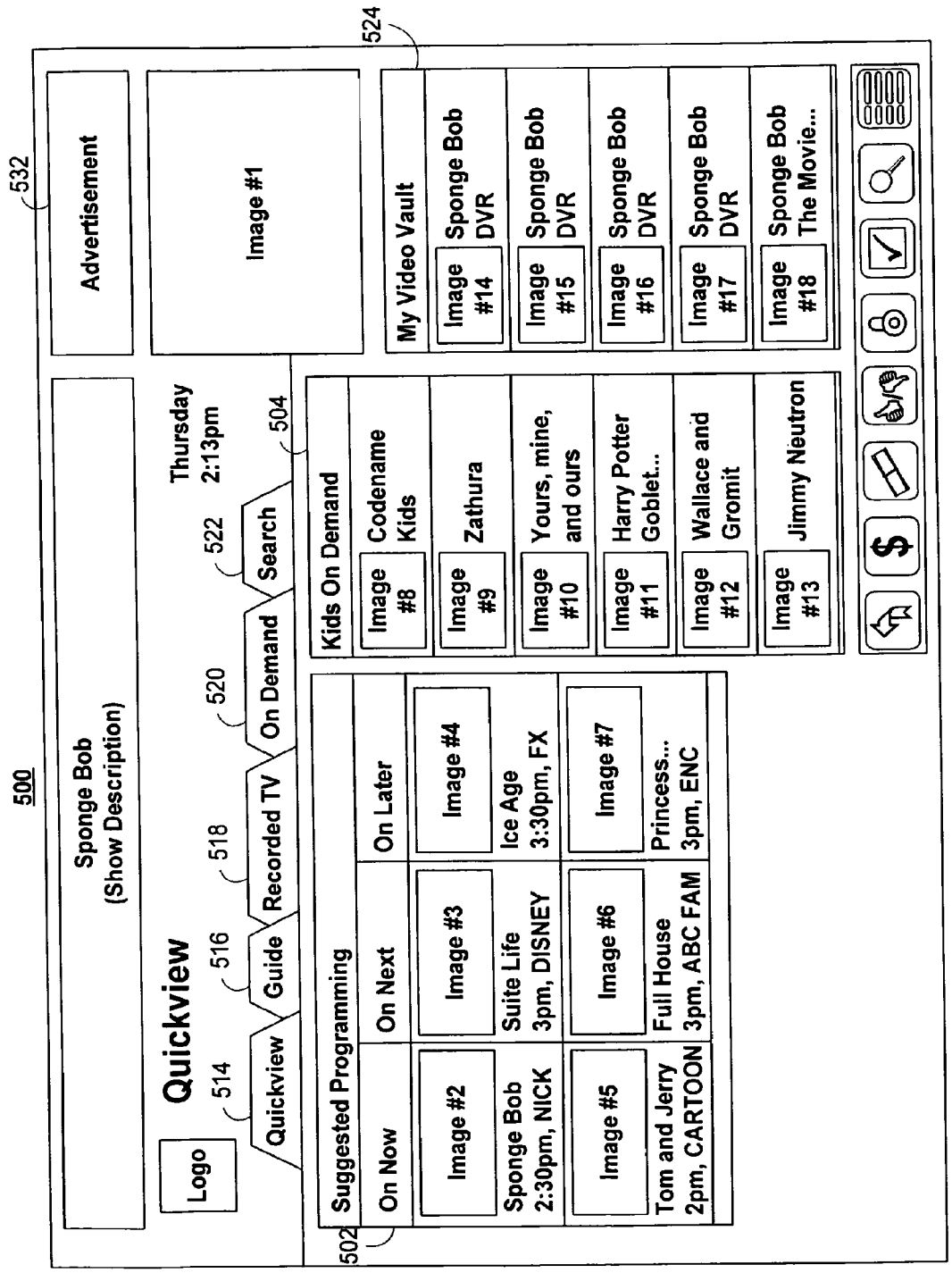

Comparing FIGS. 5a and 5b will illustrate how the interactive media guidance application may intelligently select relevant search results, change display arrangements, and change which modules are included in a guidance display based on the relevant results. The media guidance application generated Suggested Programming module 502 by searching the guidance database for content on now, on next, and on later. After finding all matching hits (the search criteria being the relevant time slots), the application filters the hits to display only those meeting the relevancy threshold. In this example, Suggested Programming module 502 has room for only the most relevant two hits for each time slot. Accordingly only these hits are selected for display. Program grid module 550, however, can fit more hits in the space allotted, and it includes the most relevant four hits for the current time slot (in this example, the grid also shows past programs).

In the example of FIG. 5b, the user and day part have changed and the relevancy determination yields a different set of relevant results. In this example, there are no more than three relevant results for the "Suggested Programming." The guide has also changed which modules are displayed; the program grid has been omitted because, in this example, there are no relevant current programs to display. In addition the "Suggested Programming" module 502 has been resized to accommodate the fewer results. It could have been resized larger and grid 550 moved further down, if the number of relevant results required it (not shown).

Another example of the guidance application changing the displayed modules is illustrated by comparing module 504 of FIGS. 5a and 5b. In this example, the relevancy threshold yields different result sets for an "on-demand" search because the user changes from an adult to a child (which may have been determined based on the change in day part as described below). Thus instead of choosing the "Top On Demand" module, the guidance application chose the "Kids On Demand" module. In each on-demand module, however, the guide selects only the most relevant six results because there is only room to display six results.

Figure 6:
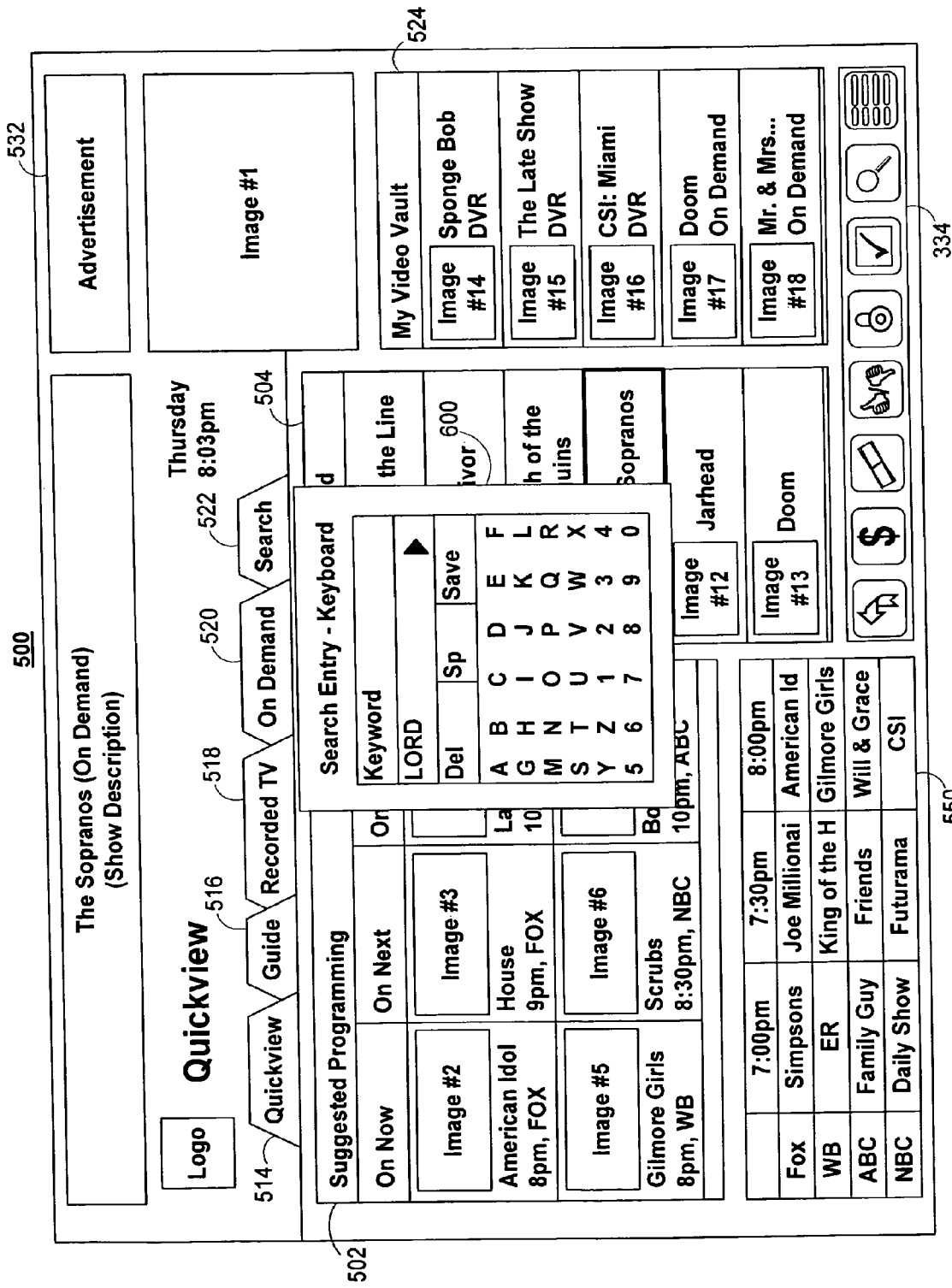
FIG. 6 is an illustrative modular quickview display having a search criteria entry popup in accordance with one embodiment of the present invention
Figure 7:
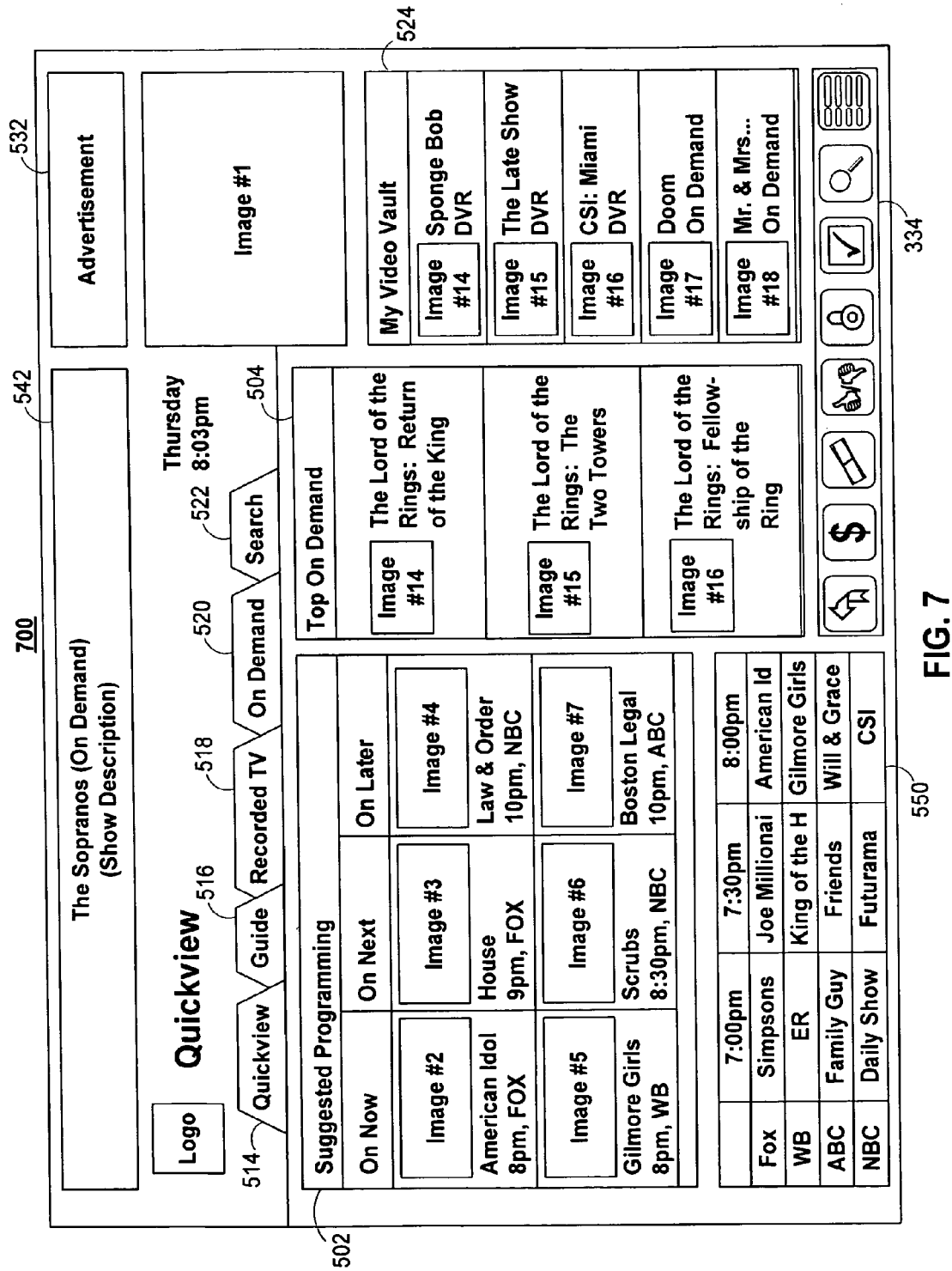
FIG. 7 is an illustrative modular quickview; display with search results resulting from the search criteria entered into the popup of FIG. 6 in accordance with one embodiment of the present invention.

The guidance application may obtain search criteria for the quickview modules using any suitable approach. For example, the guidance application may generate the search criteria based on user personalization data that was derived from user interactions or supplied by the user. In other approaches, the guidance application may receive search criteria from the user. FIG. 6 shows an illustrative popup 600 that the interactive media guidance application may display in response to a user indicating a desire to supply search criteria for a module (such as by navigating "up" from the uppermost element in a module, highlighting the module, and pressing select). The example of FIG. 6 is a keyword entry, but any suitable search type may be used (e.g., by category, by source, etc). In response to the user entering the search criteria, the guidance application may populate the module with the relevant results. FIG. 7 is an example of the "Top on Demand" module being populated with relevant on-demand results based on the user entering a keyword "Lord" (if the relevancy intelligence of the present invention were not used, the module would have had the results shown in FIG. 3a). The example of FIG. 7 also shows how the "Top on Demand" module has been resized based on the number of relevant hits.

FIGS. 4a-7 are provided to demonstrate how the guidance application may limit (or visually identify) search results to those relevant to the user and, in some embodiments, select modules and positional arrangements for modules based on the number of relevant hits. Furthermore, results meeting the relevancy threshold may be sorted according to relevance (not shown). These examples are only illustrative as, in other embodiments, other modules and relevancy thresholds, arrangements, sorting, and other variants may be used.

In some embodiments, the relevancy determination may also affect advertisement selection for the guidance displays. For example, FIGS. 5a and 5b include advertisement 532. The guidance application may select advertisement 532 because it is for relevant media that is not included on the display due to, for example, space constraints.

Figure 8:
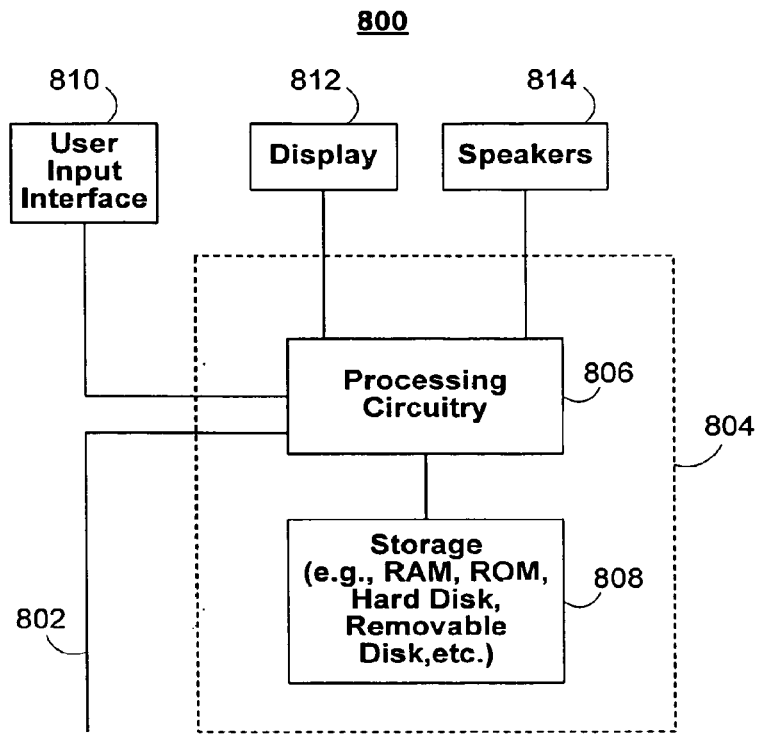
FIG. 8 is a diagram of an illustrative user equipment in accordance with one embodiment of the present invention.

Users may access media content and the media guidance application (and its display screens described above and below) from one or more of their user equipment devices. FIG. 8 shows a generalized embodiment of illustrative user equipment device 800. More specific implementations of user equipment devices are discussed below in connection with FIG. 9. User equipment device 800 may receive media content and data via input/output (hereinafter "I/O") path 802. I/O path 802 may provide media content (e.g., broadcast programming, on-demand programming, Internet content, and other video or audio) and data to control circuitry 804, which includes processing circuitry 806 and storage 808. Control circuitry 804 may be used to send and receive commands, requests, and other suitable data using I/O path 802. I/O path 802 may connect control circuitry 804 (and specifically processing circuitry 806) to one or more communications paths (described below). I/O functions may be provided by one or more of these communications paths, but are shown as a single path in FIG. 8 to avoid overcomplicating the drawing.

Control circuitry 804 may be based on any suitable processing circuitry 806 such as processing circuitry based on one or more microprocessors, microcontrollers, digital signal processors, programmable logic devices, etc. In some embodiments, control circuitry 804 executes instructions for a media guidance application stored in memory (i.e., storage 808). In client-server based embodiments, control circuitry 804 may include communications circuitry suitable for communicating with a guidance application server or other networks or servers. Communications circuitry may include a cable modem, an integrated services digital network (ISDN) modem, a digital subscriber line (DSL) modem, a telephone modem, or a wireless modem for communications with other equipment. Such communications may involve the Internet or any other suitable communications networks or paths (which is described in more detail in connection with FIG. 9). In addition, communications circuitry may include circuitry that enables peer-to-peer communication of user equipment devices, or communication of user equipment devices in locations remote from each other (described in more detail below).

Memory (e.g., random-access memory, read-only memory, or any other suitable memory), hard drives, optical drives, or any other suitable fixed or removable storage devices (e.g., DVD recorder, CD recorder, video cassette recorder, or other suitable recording device) may be provided as storage 808 that is part of control circuitry 804. Storage 808 may include one or more of the above types of storage devices. For example, user equipment device 800 may include a hard drive for a DVR (sometimes called a personal video recorder, or PVR) and a DVD recorder as a secondary storage device. Storage 808 may be used to store various types of media described herein and guidance application data, including program information, guidance application settings, user preferences or profile information, or other data used in operating the guidance application. Nonvolatile memory may also be used (e.g., to launch a boot-up routine and other instructions).

Control circuitry 804 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 804 may also include scaler circuitry for upconverting and downconverting media into the preferred output format of the user equipment 800. Circuitry 804 may also include digital-to-analog converter circuitry and analog-to-digital converter circuitry for converting between digital and analog signals. The tuning and encoding circuitry may be used by the user equipment to receive and to display, to play, or to record media content. The tuning and encoding circuitry may also be used to receive guidance data. The circuitry described herein, including for example, the tuning, video generating, encoding, decoding, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 808 is provided as a separate device from user equipment 800, the tuning and encoding circuitry (including multiple tuners) may be associated with storage 808.

A user may control the control circuitry 804 using user input interface 810. User input interface 810 may be any suitable user interface, such as a remote control, mouse, trackball, keypad, keyboard, touch screen, touch pad, stylus input, joystick, voice recognition interface, or other user input interfaces. Display 812 may be provided as a stand-alone device or integrated with other elements of user equipment device 800. Display 812 may be one or more of a monitor, a television, a liquid crystal display (LCD) for a mobile device, or any other suitable equipment for displaying visual images. In some embodiments, display 812 may be HDTV-capable. Speakers 814 may be provided as integrated with other elements of user equipment device 800 or may be stand-alone units. The audio component of videos and other media content displayed on display 812 may be played through speakers 814. In some embodiments, the audio may be distributed to a receiver (not shown), which processes and outputs the audio via speakers 814.

Figure 9:
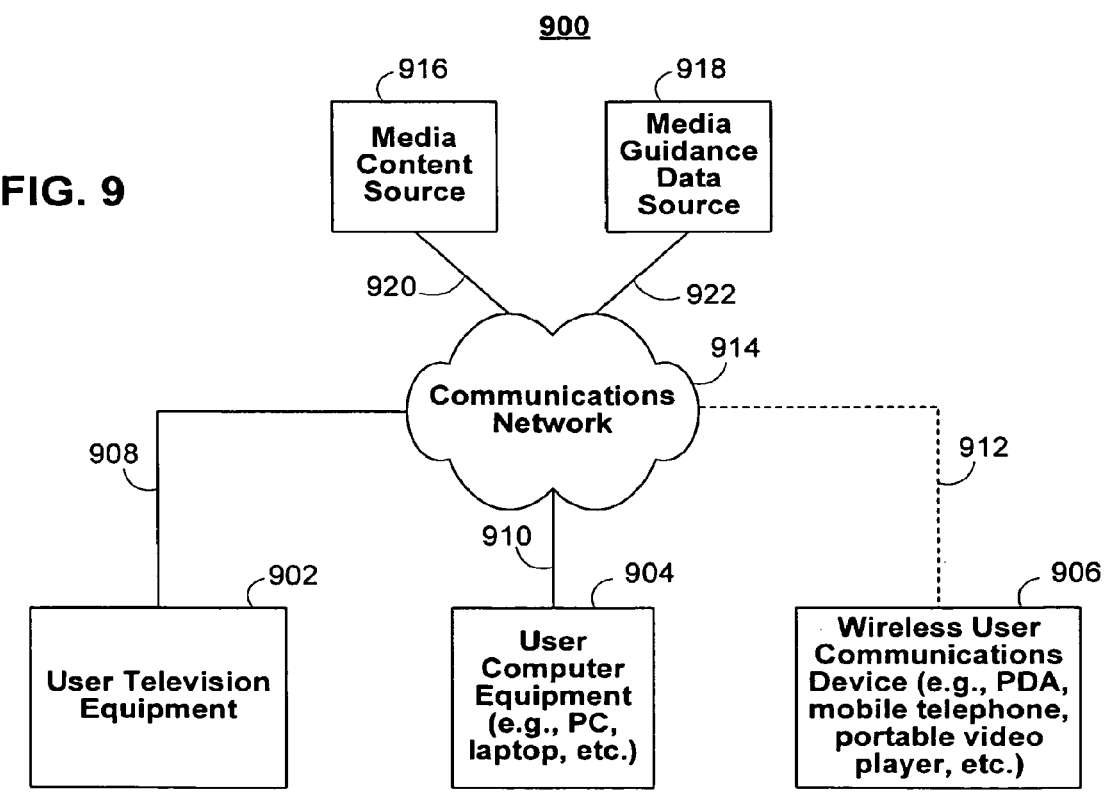
FIG. 9 is a diagram of an illustrative media system in accordance with one embodiment of the present invention.

User equipment device 800 of FIG. 8 can be implemented in system 900 of FIG. 9 as user television equipment 902, user computer equipment 904, wireless user communications device 906, or any other type of user equipment suitable for accessing media, such as a non-portable gaming machine. For simplicity, these devices may be referred to herein collectively as user equipment or user equipment devices. User equipment devices, on which a media guidance application is implemented, may function as a standalone device or may be part of a network of devices. Various network configurations of devices may be implemented and are discussed in more detail below.

User television equipment 902 may include a set-top box, an integrated receiver decoder (IRD) for handling satellite television, a television set, a digital storage device, a DVD recorder, a video-cassette recorder (VCR), a local media server, or other user television equipment. One or more of these devices may be integrated to be a single device, if desired. User computer equipment 904 may include a PC, a laptop, a tablet, a WebTV box, a personal computer television (PC/TV), a PC media server, a PC media center, or other user computer equipment. WEBTV is a trademark owned by Microsoft Corp. Wireless user communications device 906 may include PDAs, a mobile telephone, a portable video player, a portable music player, a portable gaming machine, or other wireless devices.

It should be noted that with the advent of television tuner cards for PC's, WebTV, and the integration of video into other user equipment devices, the lines have become blurred when trying to classify a device as one of the above devices. In fact, each of user television equipment 902, user computer equipment 904, and wireless user communications device 906 may utilize at least some of the system features described above in connection with FIG. 8 and, as a result, include flexibility with respect to the type of media content available on the device. For example, user television equipment 902 may be Internet-enabled allowing for access to Internet content, while user computer equipment 904 may include a tuner allowing for access to television programming. The media guidance application may also have the same layout on the various different types of user equipment or may be tailored to the display capabilities of the user equipment. For example, on user computer equipment, the guidance application may be provided as a web site accessed by a web browser. In another example, the guidance application may be scaled down for wireless user communications devices.

In system 900, there is typically more than one of each type of user equipment device but only one of each is shown in FIG. 9 to avoid overcomplicating the drawing. In addition, each user may utilize more than one type of user equipment device (e.g., a user may have a television set and a computer) and also more than one of each type of user equipment device (e.g., a user may have a PDA and a mobile telephone and/or multiple television sets).

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.tvguide.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 914. Namely, user television equipment 902, user computer equipment 904, and wireless user communications device 906 are coupled to communications network 914 via communications paths 908, 910, and 912, respectively. Communications network 914 may be one or more networks including the Internet, a mobile phone network, mobile device (e.g., Blackberry) network, cable network, public switched telephone network, or other types of communications network or combinations of communications networks. BLACKBERRY is a trademark owned by Research In Motion Limited Corp. Paths 908, 910, and 912 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 912 is drawn with dotted lines to indicate that in the exemplary embodiment shown in FIG. 9 it is a wireless path and paths 908 and 910 are drawn as solid lines to indicate they are wired paths (although these paths may be wireless paths, if desired). Communications with the user equipment devices may be provided by one or more of these communications paths, but are shown as a single path in FIG. 9 to avoid overcomplicating the drawing.

Although communications paths are not drawn between user equipment devices, these devices may communicate directly with each other via communication paths, such as those described above in connection with paths 908, 910, and 912, as well other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a trademark owned by Bluetooth SIG, INC. The user equipment devices may also communicate with each other directly through an indirect path via communications network 914.

System 900 includes media content source 916 and media guidance data source 918 coupled to communications network 914 via communication paths 920 and 922, respectively. Paths 920 and 922 may include any of the communication paths described above in connection with paths 908, 910, and 912. Communications with the media content source 916 and media guidance data source 918 may be exchanged over one or more communications paths, but are shown as a single path in FIG. 9 to avoid overcomplicating the drawing. In addition, there may be more than one of each of media content source 916 and media guidance data source 918, but only one of each is shown in FIG. 9 to avoid overcomplicating the drawing. (The different types of each of these sources are discussed below.) If desired, media content source 916 and media guidance data source 918 may be integrated as one source device. Although communications between sources 916 and 918 with user equipment devices 902, 904, and 906 are shown as through communications network 914, in some embodiments, sources 916 and 918 may communicate directly with user equipment devices 902, 904, and 906 via communication paths (not shown) such as those described above in connection with paths 908, 910, and 912.

Media content source 916 may include one or more types of media distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other media content providers. NBC is a trademark owned by the National Broadcasting Company, Inc., ABC is a trademark owned by the ABC, INC., and HBO is a trademark owned by the Home Box Office, Inc. Media content source 916 may be the originator of media content (e.g., a television broadcaster, a Webcast provider, etc.) or may not be the originator of media content (e.g., an on-demand media content provider, an Internet provider of video content of broadcast programs for downloading, etc.). Media content source 716 may include cable sources, satellite providers, on-demand providers, Internet providers, or other providers of media content. Media content source 916 may also include a remote media server used to store different types of media content (including video content selected by a user), in a location remote from any of the user equipment devices. Systems and methods for remote storage of media content, and providing remotely stored media content to user equipment are discussed in greater detail in connection with Ellis et al., U.S. patent application Ser. No. 09/332,244, filed Jun. 11, 1999, which is hereby incorporated by reference herein in its entirety.

Media guidance data source 918 may provide media guidance data, such as media listings, media-related information (e.g., broadcast times, broadcast channels, media titles, media descriptions, ratings information (e.g., parental control ratings, critic's ratings, etc.), genre or category information, actor information, logo data for broadcasters' or providers' logos, etc.), media format (e.g., standard definition, high definition, etc.), advertisement information (e.g., text, images, media clips, etc.), on-demand information, display definitions, any other type of guidance data that is helpful for a user to navigate among and locate desired media selections, and any other data used to otherwise generated interactive media guidance application displays.

In some embodiments, media guidance data source 918 provides hot-list information (i.e., data on what other users have watched as a result of searches) used by the media guidance application to provide hot list displays of relevant search results. In such embodiments, the interactive media guidance application transmits search information to media guidance data source 918 via communications network 914 and path 908, 910, or 912. The search information identifies the search criteria of a search performed by the interactive media guidance application, and the media selected for access by the user from the search results display. This information is used by the source 918 to create a database of hot lists. When the interactive media guidance application performs a search, it sends the search criteria to source 918. In response, source 918 provides from the database identifiers of media that other users have watched as a result of similar searches. The interactive media guidance application displays the identifiers in a hot list display, such as hot list display 430 of FIG. 4d.

Media guidance application data may be provided to the user equipment devices using any suitable approach. In some embodiments, the guidance application may be a stand-alone interactive television program guide that receives program guide data via a data feed (e.g., a continuous feed, trickle feed, or data in the vertical blanking interval of a channel). Program schedule data and other guidance data may be provided to the user equipment on a television channel sideband, in the vertical blanking interval of a television channel, using an in-band digital signal, using an out-of-band digital signal, or by any other suitable data transmission technique. Program schedule data and other guidance data may be provided to user equipment on multiple analog or digital television channels. Program schedule data and other guidance data may be provided to the user equipment with any suitable frequency (e.g., continuously, daily, a user-specified period of time, a system-specified period of time, in response to a request from user equipment, etc.). In some approaches, guidance data from media guidance data source 918 may be provided to users' equipment using a client-server approach. For example, a guidance application client residing on the user's equipment may initiate sessions with source 918 to obtain guidance data when needed. Media guidance data source 918 may provide user equipment devices 902, 904, and 906 the media guidance application itself or software updates for the media guidance application.

Media guidance applications may be, for example, stand-alone applications implemented on user equipment devices. In other embodiments, media guidance applications may be client-server applications where only the client resides on the user equipment device. For example, media guidance applications may be implemented partially as a client application on processing circuitry 806 of user equipment device 804 (FIG. 8) and partially on a remote server as a server application (e.g., media guidance data source 918). The guidance application displays may be generated by the media guidance data source 918 and transmitted to the user equipment devices. The media guidance data source 918 may also transmit data for storage on the user equipment, which then generates the guidance application displays based on instructions processed by control circuitry.

Media guidance system 900 is intended to illustrate a number of approaches, or network configurations, by which user equipment devices and sources of media content and guidance data may communicate with each other for the purpose of accessing media and providing media guidance. The present invention may be applied in any one or a subset of these approaches, or in a system employing other approaches for delivering media and providing media guidance. The following three approaches provide specific illustrations of the generalized example of FIG. 9.

In one approach, user equipment devices may communicate with each other within a home network. User equipment devices can communicate with each other directly via short-range point-to-point communication schemes describe above, via indirect paths through a hub or other similar device provided on a home network, or via communications network 914. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,710, filed Jul. 11, 2005. Different types of user equipment devices in a home network may also communicate with each other to transmit media content. For example, a user may transmit media content from user computer equipment to a portable video player or portable music player.

In a second approach, users may have multiple types of user equipment by which they access media content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. patent application Ser. No. 10/927,814, filed Aug. 26, 2004, which is hereby incorporated by reference herein in its entirety.

In a third approach, users of user equipment devices inside and outside a home can use their media guidance application to communicate directly with media content source 916 to access media content. Specifically, within a home, users of user television equipment 904 and user computer equipment 906 may access the media guidance application to navigate among and locate desirable media content. Users may also access the media guidance application outside of the home using wireless user communications devices 906 to navigate among and locate desirable media content.

It will be appreciated that while the discussion of media content has focused on video content, the principles of media guidance can be applied to other types of media content, such as music, images, etc.

Figure 10:
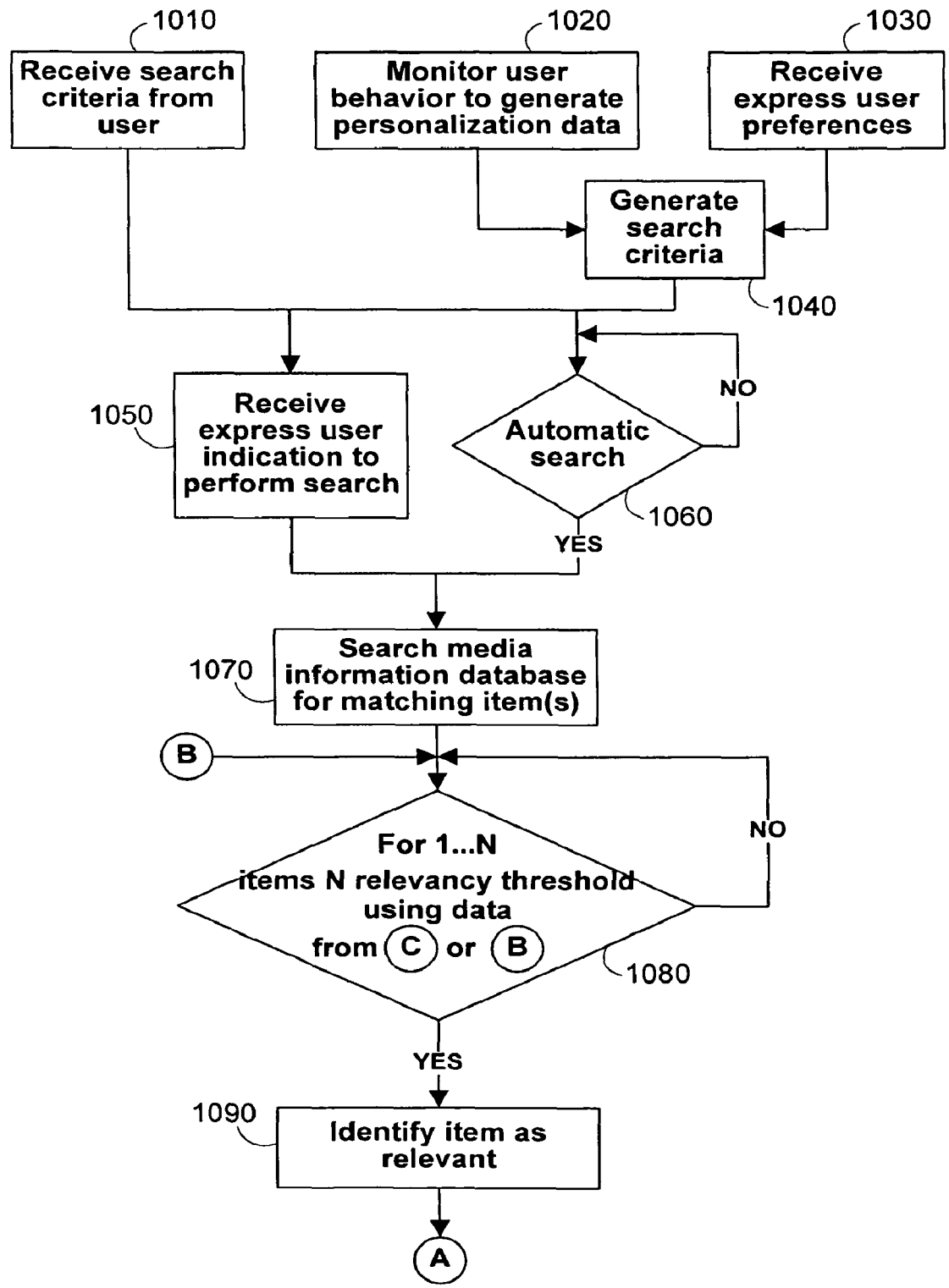
FIGS. 10-12 are flowcharts of illustrative steps involved in performing the processes of various embodiments of the present invention.
Figure 11:
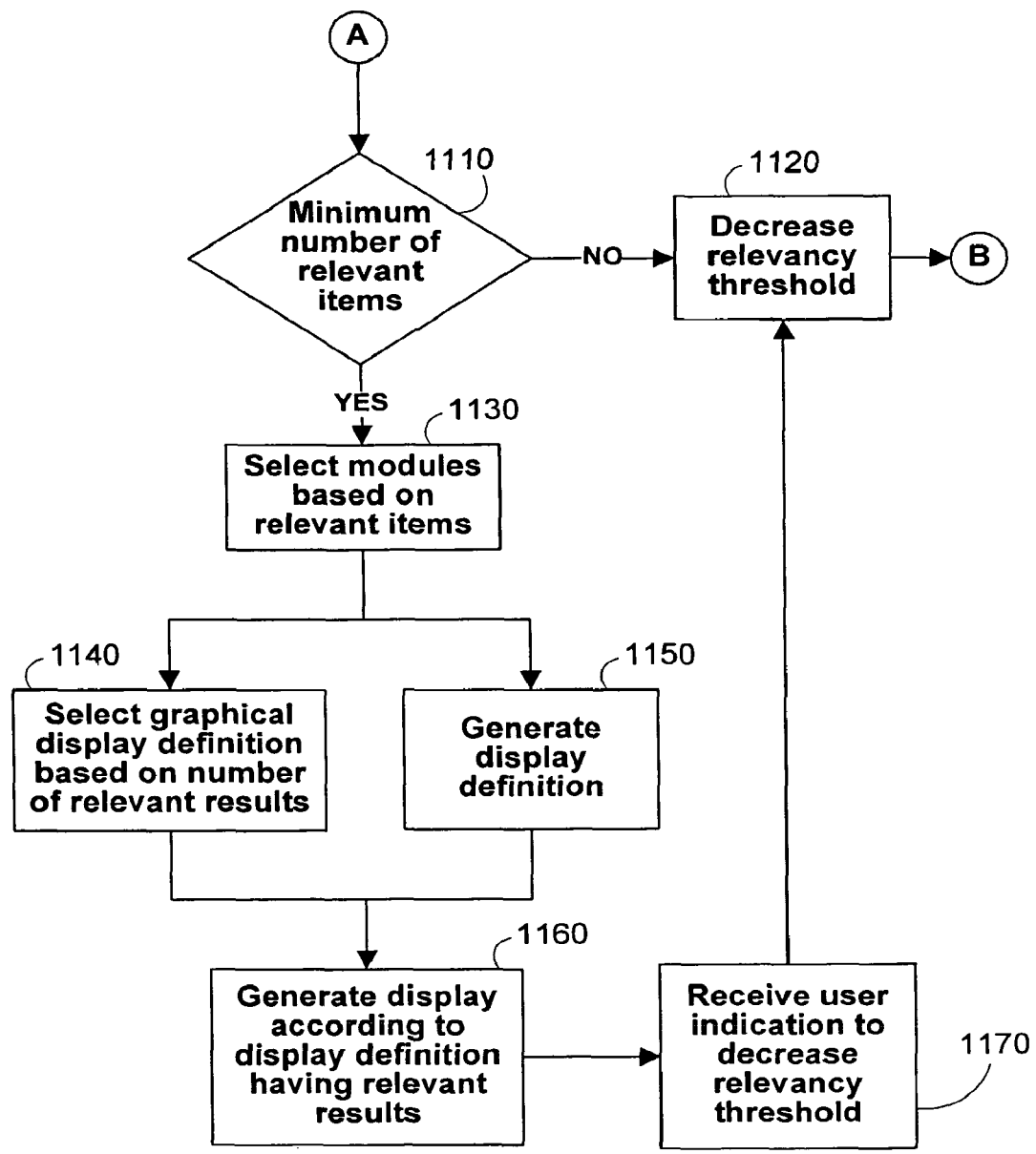
Figure 12:
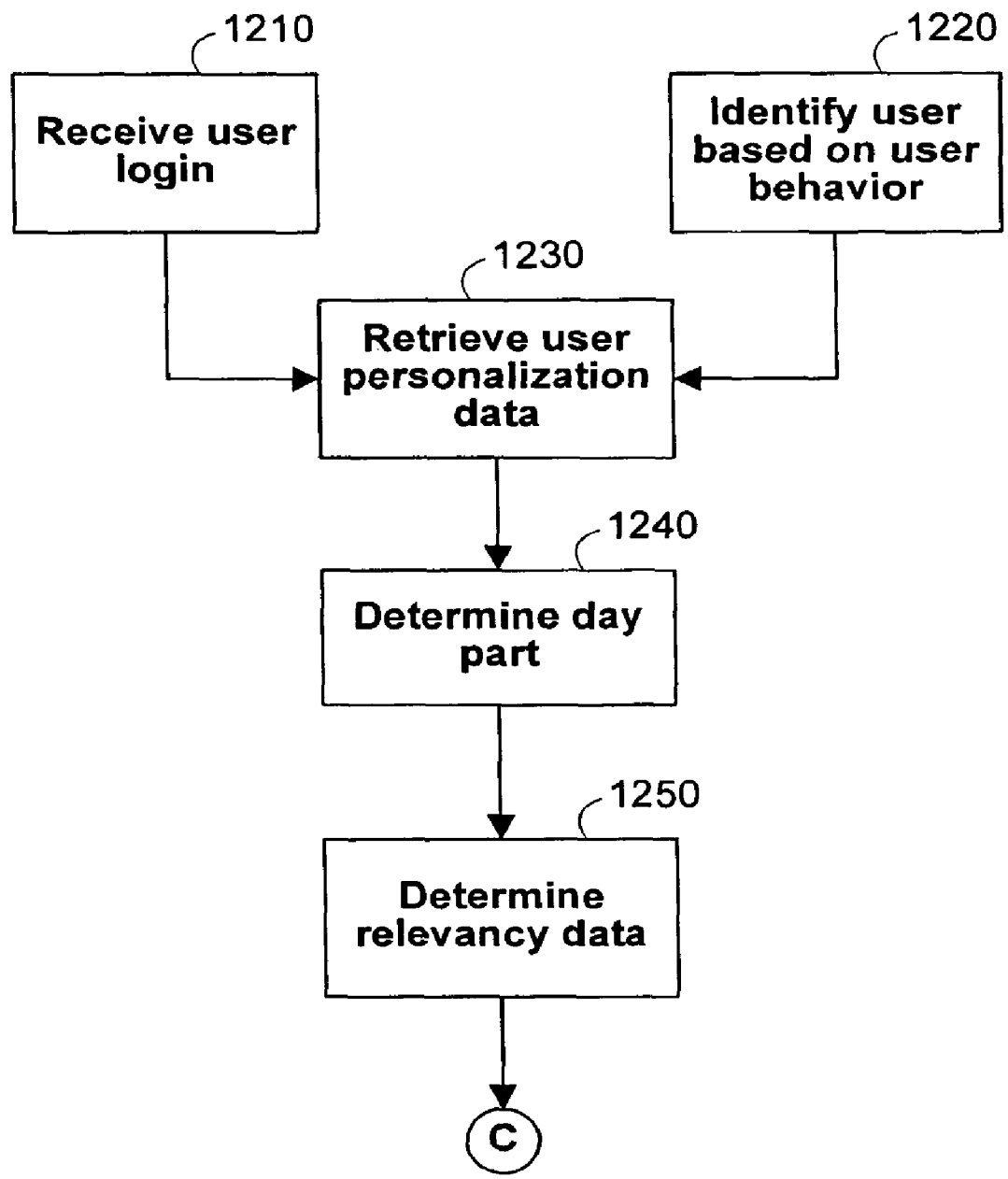

FIGS. 10-12 are flowcharts of processes for various embodiments of the present invention. These flowcharts are only illustrative, as various steps may be omitted, other steps added, or the steps reordered, depending on the embodiment of the invention.

Process 1000 of FIG. 10 demonstrates illustrative steps involved in some embodiments for obtaining search criteria, searching for matching items, and identifying relevant matches. Steps 1010 though 1040 are directed to obtaining search criteria in various embodiments. At step 1010, the interactive media guidance application receives search criteria from the user. In some embodiments, for example, the interactive media guidance application (which is implemented on processing circuitry 806 (FIG. 8)) receives the search criteria from user input interface 810 (FIG. 8). The search criteria may have been entered by the user in, for example, the by keyword or by category search displays of FIGS. 4a-4d, or the search entry keyboard of popup 600 of FIG. 6.

Steps 1020-1040 are employed by the interactive media guidance application in embodiments where search criteria are generated by the application (which may be in addition to receiving search criteria from the user). At step 1020, the interactive media guidance application monitors user behavior to generate personalization data (such techniques are well known to those skilled in the art). At step 1030, the user enters express user preferences (such as by rating content, genres, categories, etc.). Both approaches may be implemented. At step 1040, the interactive media guidance application generates search criteria from the personalization data/preferences (as used herein, "personalization data" may refer to both express user preferences and data generated via user behavior monitoring).

The following examples will serve to illustrate the operation of step 1040. Assume, for example, that user behavior monitoring or express user preferences suggests the user likes action movies. The interactive media guidance application may generate, from internal data structures defining the categories, an "action" text string for use as search criteria to search for action movies or programs, or related advertisements. As another example, assume that the guidance application determines that the user likes a particular actor such as "Sylvester Stallone." From this personalization information the interactive media guidance application may generate "Stallone" as search criteria to, for example, search for suggested Stallone movies, search for related advertisements, or any other suitable search.

Steps 1050 and 1060 are alternative steps one or both of which may be performed in any given embodiment. At step 1050, the interactive media guidance application receives an express user indication to perform a search. This express indication may be of any suitable type, such as by selecting a keyword (e.g., FIG. 3a), selecting a sub-category (e.g., FIG. 3b), or the user selection of an option that initiates a search with search criteria generated by the interactive media guidance application at step 1040. At step 1060, the interactive media guidance application determines whether an automatic search should be performed, such as in response to a timer function, or in any other way that is not tied to a user action (e.g., such as when generating programming suggestions for subsequent use).

In response to the user indication or determination that a search should be performed from steps 1050 and 1060, the interactive media guidance application searches media information for matching items (step 1070). The media information may be stored, for example, in a database in storage 808 (FIG. 8) or media guidance data source 918 (FIG. 9) (such as in client-server-based architectures). The items that are searched for may be any suitable guidance application data associated with media that is the subject of the search. Media may be searched for based on associated program listings, titles, information in media descriptions, metadata describing scenes in video media, or any other suitable items.

At step 1080, the interactive media guidance application determines whether each item is relevant to the user which, in this embodiment, involves determining whether the item is greater than (or equal to) a relevancy threshold (which will be explained more fully below). It should be noted that the determination of step 1080 may be performed on each hit after it is found, or when the entire search is complete. This step will be described more below. At step 1090, the interactive media guidance application identifies the item as relevant (this may be accomplished by, for example, setting a flag associated with the item in the data structure representing the result set).

The process continues in FIG. 11, where at step 1110 the interactive media guidance application determines whether a minimum number of relevant items were found. If not, the application decreases the relevancy threshold (step 1120) and returns to step 1080 of FIG. 10 to determine which items meet the new relevancy threshold.

Once the relevancy threshold is set and the minimum number of relevant items found, the interactive media guidance application in this embodiment selects modules for display based on the relevant items (step 1130). For example, the interactive media guidance application may determine whether a "Top on Demand" or "Kids on Demand" (FIGS. 5*a* and 5*b*, respectively) module is appropriate for display based on whether the items are relevant to a child or adult. Or, the interactive media guidance application may determine whether a recommendations area (e.g., area 420 of FIG. 4*c*) or hot list area (e.g., area 430 of FIG. 4*d*) are used.

After selecting the relevant modules, the process continues to one of steps 1140 or 1150 (some embodiments may employ both steps, but only one will be performed in a given instance). At step 1140, the interactive media guidance application selects a graphical display definition based on the number of relevant results (i.e., items meeting the relevancy threshold). Graphical display definitions define the look and feel of a guidance application display, or a module for a guidance application display. In this step, the interactive media guidance application retrieves display definitions from storage 808 (FIG. 8) and populate it with the relevant results.

In an alternative approach, the interactive media guidance application generates display definitions at run time (step 1150). For example, the interactive media guidance application may be an object oriented application with objects representing each module, such as the modules of FIGS. 5*a* and 5*b*. Each module object may have associated methods for generating the object for display. The methods of a module may generate different looks of modules based on the number of relevant results. At step 1160, the interactive guidance application generates the display of relevant results according to the display definitions selected or generated at steps 1140 and 1150. In some embodiments, only the relevant results are displayed. In others, the relevant results are visually distinguished from the non-relevant (or lesser relevant) results. This may be accomplished by coloring, highlighting, or using icons.

Whether display definitions are retrieved from storage 808 (FIG. 8) or generated at run time (such as in the object oriented approach described above), they are used to provide various desired effects in the display of relevant search results. For example, the display area size of a module having relevant results may be affected. The colors used to display relevant results may be affected. The positional arrangement of modules may be affected. Any other suitable display effect may also be used.

In some embodiments, the interactive media guidance application may allow the user to adjust the relevancy threshold. At step 1170, the interactive media guidance application receives a user indication from user input interface 810 (FIG. 8) that instructs the application to decrease the relevancy threshold (the user may also increase the threshold, which is not shown in the figure). In response, the process returns to step 1120.

FIG. 12 is a flowchart an illustrative process 1200 for providing relevancy information to step 1080 of FIG. 10. Either of steps 1210 and 1220 are used to identify the user for purposes of defining the relevancy threshold (both steps may be employed at different times in some embodiments). At 1210, the interactive media guidance application receives from user input interface 810 (FIG. 8) user login information that uniquely identifies the user. At step 1220, the interactive media guidance application determines the user based on monitored user behavior (performed by the user with user input interface 810 (FIG. 8)). For example, the interactive media guidance application may have associated certain behaviors with a particular user profile. Or, in some embodiments, the interactive media guidance application may associate user profiles with certain day parts as described in, for example, Ferrone U.S. Provisional Patent application Ser. No. 60/848,600, filed Sep. 29, 2006, which is hereby incorporated by reference herein in its entirety.

At step 1230, the interactive media guidance application retrieves from storage 806 (FIG. 8) user personalization data for the user or user profile identified at step 1210 or 1220. This data represents the user's media interests, and is the basis for determining relevancy for the search results. Leaving FIG. 12 and turning to FIG. 13 temporarily, illustrative personalization data table 1300 is maintained by the interactive media guidance application and stored in storage 806 (FIG. 8). The interactive media guidance application posts or changes entries to table 1300 in response to, for example, the user inputting express user media preferences using user input interface 810 (FIG. 8), or after having monitored user behavior and determined the user or user's interest(s).

Personalization table 1300 includes five fields. Field 1310 identifies a user or, when a user is not expressly identified, a user profile. Field 1320 identifies media attributes of interest, such as genre, actor, media type or any other media attribute. Field 1330 identifies values for the attribute 1320 of a record. For example, an attribute "genre" may have an associated value of action or children as shown. Relevance value field 1340 is a numeric that specifies how important the attribute-value pair is to the user. In one of the exemplary records of table 1300, for example, action is a very important attribute value to user 1 (as designated by a relevance value of 10). Field 1350 specifies a day part for the user-attribute-value-relevance value quartet. In the first row, for example, the quartet applies to the time of 8:00 PM to 10:00 PM.

Returning to FIG. 12, process 1200 continues at step 1240 where the interactive media guidance application determines the current day part (such as by making a call to the system clock in processing circuitry 806 (FIG. 8)). At step 1250, the interactive media guidance application determines the relevancy data for step 1080 of FIG. 10 by selecting only the records from table 1300 that are relevant to the identified user and day part. This relevancy data is fed to step 1080 of FIG. 10.

Returning to step 1080 of FIG. 10, the determination of how the search results may be determined to be sufficiently relevant for some embodiments can now be explained. For each search result, the interactive media guidance application compares the attributes of the result to the relevancy data from step 1250 (FIG. 12). Any suitable algorithm may then be employed to determine whether the result is sufficiently relevant. In some embodiments, the relevancy threshold is a percentage of words from the item that match the search criteria.

In other embodiments, a weighted distance algorithm is used where the output of the algorithm, d, is the square root of the sum of the squares of v1V1 . . . vnVn; where v=the relevancy value of field 1340 of personalization table 1300 (FIG. 13), and V is a distance vector between the value for an attribute from field 1330 of personalization table 1300 (FIG. 13) and the value of the attribute of the result. The distances between attribute values may be maintained in a table by the interactive media guidance application in storage 808 (FIG. 8) (not shown). The interactive media guidance application determines if d for a result is greater than or equal to the relevance threshold, which is a variable stored by the interactive media guidance application and is set to an initial amount based on the amount of relevance the system provider of the interactive media guidance application would like to provide. This amount may be decreased (in this embodiment the threshold would actually be increased to allow for larger distances d) at step 1120 (FIG. 11) in incremental amounts (such as amounts equal to one distance vector amount) when the number of relevant hits does not meet a predefined minimum number.

Figure 14:
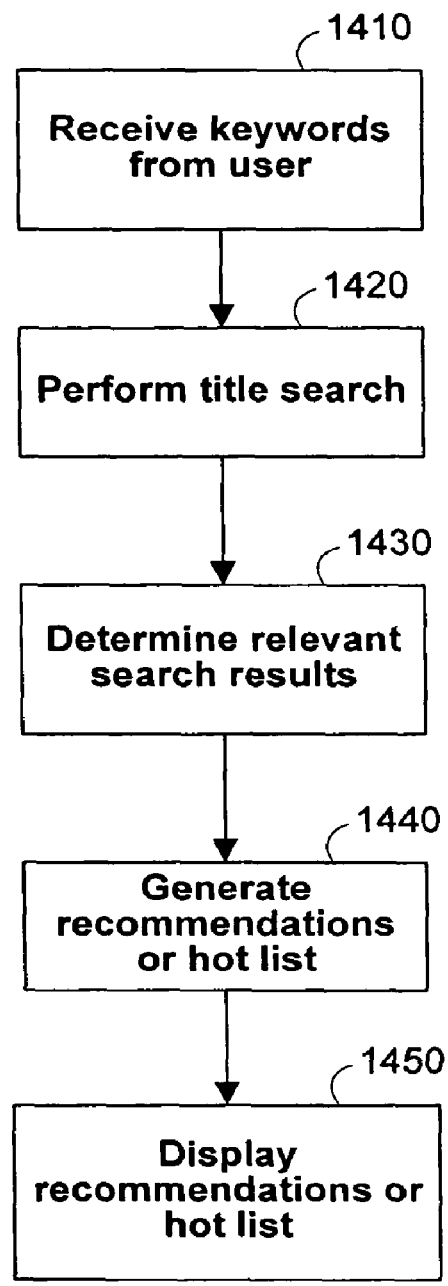
FIG. 14 is a flowchart of illustrative steps involved in providing relevant recommendations in one embodiment of the present invention.

FIG. 14 is a flow chart of another illustrative process 1400 in accordance with one embodiment of the present invention, in which the interactive media guidance application is a program guide. At step 1410 the interactive program guide receives keywords from the user for a title search. The user may have entered the keywords using an on-screen keyboard (such as that shown in FIG. 4a for example) using a remote control, or any other suitable interface. At step 1420, the program guide performs the title search by searching for program titles having the keywords in a database of guidance data from source 918 (FIG. 9). At step 1430, the program guide determines which results are relevant as described above, and generates a recommendations or hot list (step 1440). Recommendations may be generated based on user personalization information as described above. Hot lists may be generated based on hot list information from source 918 (FIG. 9) as described above. At step 1450, the program guide displays a program guide display having the recommendations or hot list.

FIG. 15 is an illustrative data structure 1500 for a display definition. In this example, the data structure is a table and identifies three display characteristics of a "Top On Demand" module (such as the "Top On Demand" module of FIGS. 5a and 7) for a given number of relevant results (in this example six and three results, respectively). The table defines the size of the module, the element size of the individual relevant results, and the colors to be used. This table may be retrieved by the interactive media guidance application as part of step 1140 of FIG. 11 to display search results in different display configurations based on the number of relevant results. Table 1500 is only illustrative, as any other suitable data structure and set of display characteristics may be used for varying display configurations based on the number of relevant results.

In accordance with the foregoing, systems and methods for providing search displays of relevant media listings are provided. One skilled in the art will appreciate that the invention can be practiced by other than the described embodiments, which are presented for purposes of illustration and not by way of limitation, and the invention is limited only by the claims.

What is claimed is:

1. A method for limiting search results based on relevancy in an interactive media guidance application, comprising:
defining a number of panels in a video mosaic display;
searching a database of media guidance application data for media content items matching search criteria;
determining whether the media content items matching the search criteria meet a relevancy threshold;
determining whether the number of media content items meeting the relevancy threshold meets a minimum number of matching media content items, wherein the minimum number is equal to the defined number of panels;
in response to determining that the number of media content items meeting the relevancy threshold is less than the minimum number, incrementally decreasing the relevancy threshold until the number of media content items meeting the relevancy threshold meets the defined number of panels; and
generating the video mosaic display having, from among the matching media content items only those matching items determined to meet or exceed the relevancy threshold.

2. The method defined in claim 1 wherein:
the search criteria includes key words;
each item matching the search criteria includes at least one word matching the search criteria; and
the relevancy threshold comprises a defined percentage of the number of words in the item that match the key words.

3. The method defined in claim 1 further comprising determining the relevancy threshold based on personalization data for a user of the interactive media guidance application.

4. The method defined in claim 3 wherein the method further comprises generating the user personalization data from express user media preferences.

5. The method defined in claim 3 wherein the method further comprises generating the user personalization data by monitoring user interactions with the interactive media guidance application.

6. The method defined in claim 1 further comprising selecting the relevancy threshold from a plurality of relevancy thresholds based on the time of day that the search is performed, wherein each threshold of the plurality is associated with a different time of day.

7. The method defined in claim 1 wherein generating the display comprises sorting the items in the display by relevance.

8. The method defined in claim 1 wherein the relevancy threshold is defined in programming instructions of an interactive media guidance application.

9. The method defined in claim 1 wherein the relevancy threshold is specified in data received by an interactive media guidance application.

10. The method defined in claim 1 wherein the items searched for are program titles, program listings, program descriptions, or words in metadata describing scenes in a program.

11. The method defined in claim 1 wherein the search criteria are received from a user.

12. The method defined in claim 1 wherein the search criteria are generated by the interactive media guidance application based on personalization data for a user of the interactive media guidance application.

13. The method defined in claim 1 wherein generating the display comprises representing the items using text, graphics, or video.

14. The method defined in claim 1 wherein the interactive media guidance application is an interactive television program guide.

15. An interactive media guidance system for limiting search results based on relevancy comprising processing circuitry configured to:
define a number of panels in a video mosaic display;
search a database of media guidance application data for media content items matching search criteria;
determine whether the media content items matching the search criteria meet a relevancy threshold;
determine whether the number of media content items meeting the relevancy threshold meets a minimum number of matching media content items, wherein the minimum number is equal to the defined number of panels;
in response to determining that the number of media content items meeting the relevancy threshold is less than the minimum number, incrementally decrease the relevancy threshold until the number of media content items meeting the relevancy threshold meets the defined number of panels; and
generate the video mosaic display comprising, from among the matching media content items, only those matching items determined to meet or exceed the relevancy threshold.

16. The system defined in claim 15 wherein:
the search criteria includes key words;
each item matching the search criteria includes at least one word matching the search criteria; and
the relevancy threshold comprises a defined percentage of the number of words in the item that match the key words.

17. The system defined in claim 15 wherein the processing circuitry is further configured to determine the relevancy threshold based on personalization data for a user of the interactive media guidance application.

18. The system defined in claim 17 wherein the processing circuitry is further configured to generate the user personalization data from express user media preferences.

19. The system defined in claim 17 wherein the processing circuitry is further configured to generate the user personalization data by monitoring user interactions with the interactive media guidance application.

20. The system defined in claim 15 wherein the processing circuitry is further configured to select the relevancy threshold from a plurality of relevancy thresholds based on the time of day that the search is performed, wherein each threshold of the plurality is associated with a different time of day.

21. The system defined in claim 15 wherein the processing circuitry is further configured to sort by relevance the matching items of the display.

22. The system defined in claim 15 wherein the relevancy threshold is defined in programming instructions of an interactive media guidance application implemented at least partially on the processing circuitry.

23. The system defined in claim 15 wherein the relevancy threshold is specified in data received by the processing circuitry.

24. The system defined in claim 15 wherein the items searched for are program titles, program listings, program descriptions, or words in metadata describing scenes in a program.

25. The system defined in claim 15 wherein the search criteria are received by the processing circuitry from a user input interface device.

26. The system defined in claim 15 wherein the search criteria are generated by the processing circuitry based on personalization data for a user of the interactive media guidance application.

27. The system defined in claim 15 wherein the processing circuitry is further configured to represent the displayed items using text, graphics, or video.

28. The system defined in claim 15 further comprising an interactive television program guide implemented at least partially on the processing circuitry, wherein the program guide contains programming logic for configuring the processing circuitry.

29. The method defined in claim 1, wherein the relevancy threshold is determined by the user.

30. The system defined in claim 15 wherein the relevancy threshold is determined by the user.

31. The method defined in claim 1, wherein determining whether the number of items meeting the relevancy threshold meets a minimum number and incrementally decreasing the relevancy threshold until the number of items meeting the relevancy threshold meets the minimum number occur within a single search of the database of media guidance application data.

32. The system defined in claim 15 wherein the processing circuitry is further configured to determine whether the number of items meeting the relevancy threshold meets a minimum number and incrementally decrease the relevancy threshold until the number of items meeting the relevancy threshold meets the minimum number within a single search of the database of media guidance application data.

33. The method of claim 1 further comprises:
computing a distance value using a distance algorithm for items matching the search criteria in the database.

34. The system of claim 15 wherein the processing circuitry is further configured to:
compute a distance value using a distance algorithm for items matching the search criteria in the database.

* * * * *